(12) United States Patent
Tsai et al.

(10) Patent No.: US 7,541,709 B2
(45) Date of Patent: Jun. 2, 2009

(54) ULTRA-THIN MOTOR STRUCTURE

(75) Inventors: Ming-Chin Tsai, Kaohsiung (TW); Chien-Jen Chen, Kaohsiung (TW); Liang-Yi Hsu, Makung (TW); Mi-Ching Tsai, Tainan (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 560 days.

(21) Appl. No.: 11/320,655

(22) Filed: Dec. 30, 2005

(65) Prior Publication Data

US 2007/0152526 A1    Jul. 5, 2007

(51) Int. Cl.
*H02K 3/26* (2006.01)
*H02K 5/173* (2006.01)

(52) U.S. Cl. .................. 310/90; 310/254; 310/268; 310/40 MM; 310/DIG. 6

(58) Field of Classification Search ............ 310/DIG. 6, 310/40 MM, 268, 179, 90, 254, 184
See application file for complete search history.

(56) References Cited

U.S. PATENT DOCUMENTS

| 4,891,537 A * | 1/1990 | Shiraki et al. ............. 310/68 B |
| 6,515,826 B1 * | 2/2003 | Hsiao et al. ............. 360/123.45 |
| 2002/0175582 A1 * | 11/2002 | Lopatinsky et al. .... 310/156.01 |

* cited by examiner

*Primary Examiner*—Quyen Leung
*Assistant Examiner*—David W. Scheuermann
(74) *Attorney, Agent, or Firm*—Rabin & Berdo, P.C.

(57) ABSTRACT

An ultra-thin motor structure including a stator assembly and a rotator assembly is provided. The stator assembly includes at least one bearing with a bore, a base, and a winding plate. The base has a protruding portion and a deck disposed in the protruding portion. The winding plate is stacked on the deck, and includes a plurality of coils formed by an electroforming process or etching process. Furthermore, the rotator assembly is disposed on the stator assembly, and includes a spindle, a top cover, and a permanent magnet ring. The spindle is fixed in the bore of the bearing, and the permanent magnet ring is disposed on the winding plate and supports the top cover thereon. Thereby, the ultra-thin motor structure can enhance the assembly and mass-production of the motor, and satisfy demands for thinning and performance of the motor.

13 Claims, 3 Drawing Sheets

ULTRA-THIN MOTOR STRUCTURE

BACKGROUND OF THE INVENTION

1. Field of Invention

The present invention relates to a structure design of a motor, and more particularly to an ultra-thin motor structure capable of effectively thinning the motor and improving power density.

2. Related Art

The advent of the so-called information age is due, in most part, to the proliferation of the mass media and the internet, but the development of the spindle motor, which is most often used in Optical Disk Drives or hard disk drivers to store massive electronic data, also plays a key role.

Nowadays, as compact and lightweight designs have become the mainstream of the market and even the norms of the industry, most electronic products have to be made smaller and smaller to meet consumers' insatiable demand for things slim and small. As a result, the thinning of components in such products is becoming increasingly important. The spindle motor is no exception to this trend. Manufacturers have been making every effort to make it smaller, while at the same time, trying hard to keep, or even increase, its operating performance. As nearly all electronic products are required, either by consideration of user comfort or by a device's need for efficiency and ease of operation, to have stable and smooth running motors, such motors as used in Optical Disk Drives and hard disk drivers all have to meet a very high standard in this respect. As a result, many smooth running micro motors have been developed by industries.

However, development of all these micro motors of the prior art have now reached a bottleneck. Most conventional permanent-magnet motors, for instance, be they brushed or brushless, adopt either a radial air gap or a radial magnetic flux structure. As the motors contain multiple permanent-magnets or a lot of soft magnetic materials, they sometimes produce magnetic cogging that make the motors wobble when the motors are running, generating torque ripples and causing uneven rotation or vibration noises of the motors. In addition, the conventional motor structure is stacked with magnetic conducting material, so that thinning of the motor is obstructed.

Additionally, the winding coil of the conventional motor structure employs copper wires, and produces a flux linkage induction for actuating the motor. However, since the manufacture of copper wire diameters is for the most part already standardized, the diameter cannot be varied arbitrarily according to changes in design. Besides, the quality of copper wires is prone to change and variation depending on environment and processing conditions, causing a decline in conductivity. Once conductivity declines, copper loss is increased, which significantly affects the efficiency of the motor and limits the improvement of the efficiency.

Therefore, the conventional motor structure with the magnetic conducting material has the disadvantages of magnetic cogging, thus the operation is not smooth and thinning of the structure cannot be achieved. Therefore, it is an object for those skilled in the art to develop a motor structure, which can thin the motor and improve efficiency.

SUMMARY OF THE INVENTION

In view of the problems of the conventional technique described above, the present invention provides an ultra-thin motor structure for solving the disadvantage of conventional motors having a magnet and a great deal of magnetic conducting material, i.e., solving the magnetic cogging and torque ripple of the motor when operating and the difficulty in thinning of the motor, and meanwhile, overcoming the disadvantage of the conventional motor of increased copper loss caused by conductivity decline of the copper wire.

To achieve the above objects, the present invention provides an ultra-thin motor structure including a stator assembly and a rotator assembly. The stator assembly includes at least one bearing with a bore, a base, and a winding plate. The base has a protruding portion and a deck. The bearing is disposed in the protruding portion. The winding plate is stacked on the deck, and includes a plurality of coils formed by an electroforming process or etching process. Furthermore, the rotator assembly is disposed on the stator assembly, and includes a spindle, a top cover, and a permanent magnet ring. The spindle is fixed in the bore of the bearing, and the permanent magnet ring is disposed on the winding plate and supports the top cover thereon.

An ultra-thin motor structure of the present invention is provided with the following advantages over conventional methods, and the significant function improvements described below.

1. The present invention is an ultra-thin motor structure, as compared with various motor components of the conventional motor structure, is made using a micro/meso metal forming technique, improving the assembly and mass-production of the motor, satisfying demands for thinning and performance of the motor, and significantly reducing production costs.

2. According to an ultra-thin motor structure of the present invention, the plurality of coils of the winding plate are formed by a micro electroforming process or etching process, so that coil diameters of different micro-nanometer sizes can be made, and the wire density is improved. Therefore, compared with the conventional motor structure, the thickness of the motor windings can be effectively controlled to thin the motor and copper loss is reduced.

3. According to an ultra-thin motor structure of the present invention, the coil winding region of the ultra-thin motor structure is rhombus-shaped or kite-shaped. The wire width and height of the coils formed by an electroforming process or etching process are of micro-nanometer scale, so that compared with conventional sector-shaped, round-shaped, or triangle-shaped air-gap motors, the magnetic flux density can be enhanced significantly, and thereby the present motor structure has a higher area usage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
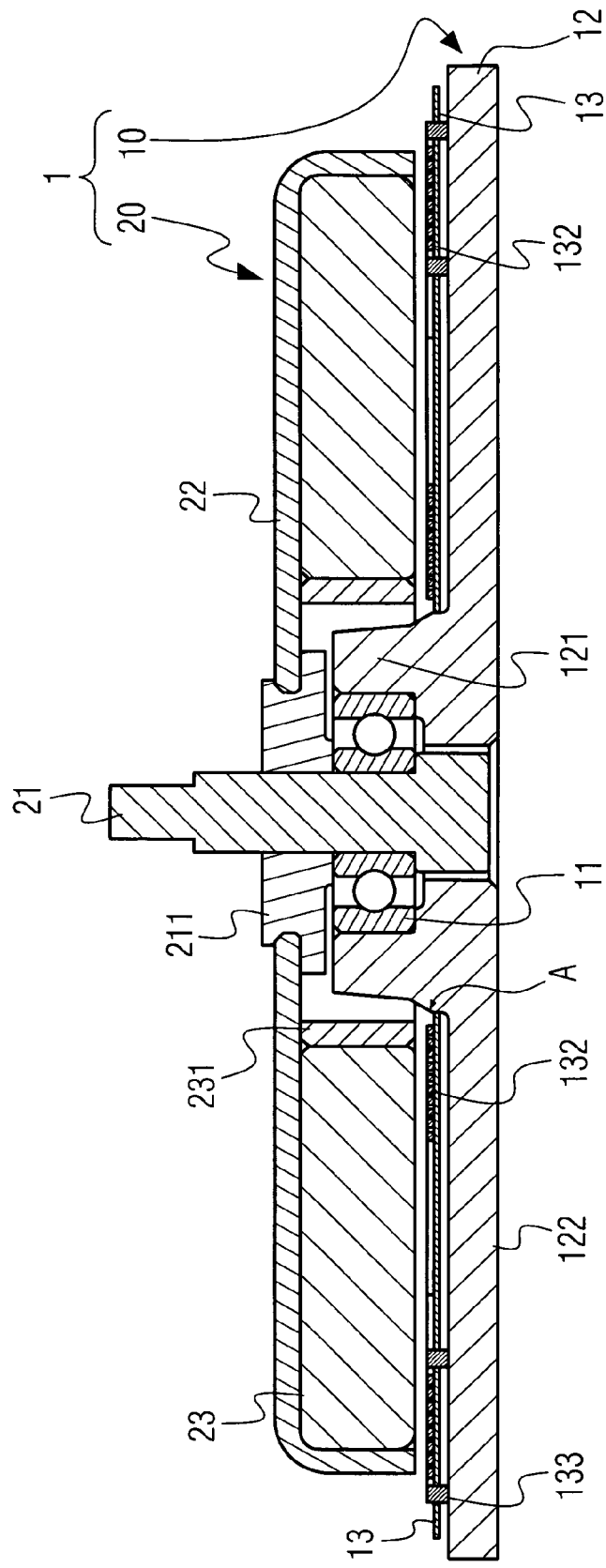
FIG. 1 is a schematic cross-section view of an ultra-thin motor structure according to a preferred embodiment of the present invention.
Figure 2:
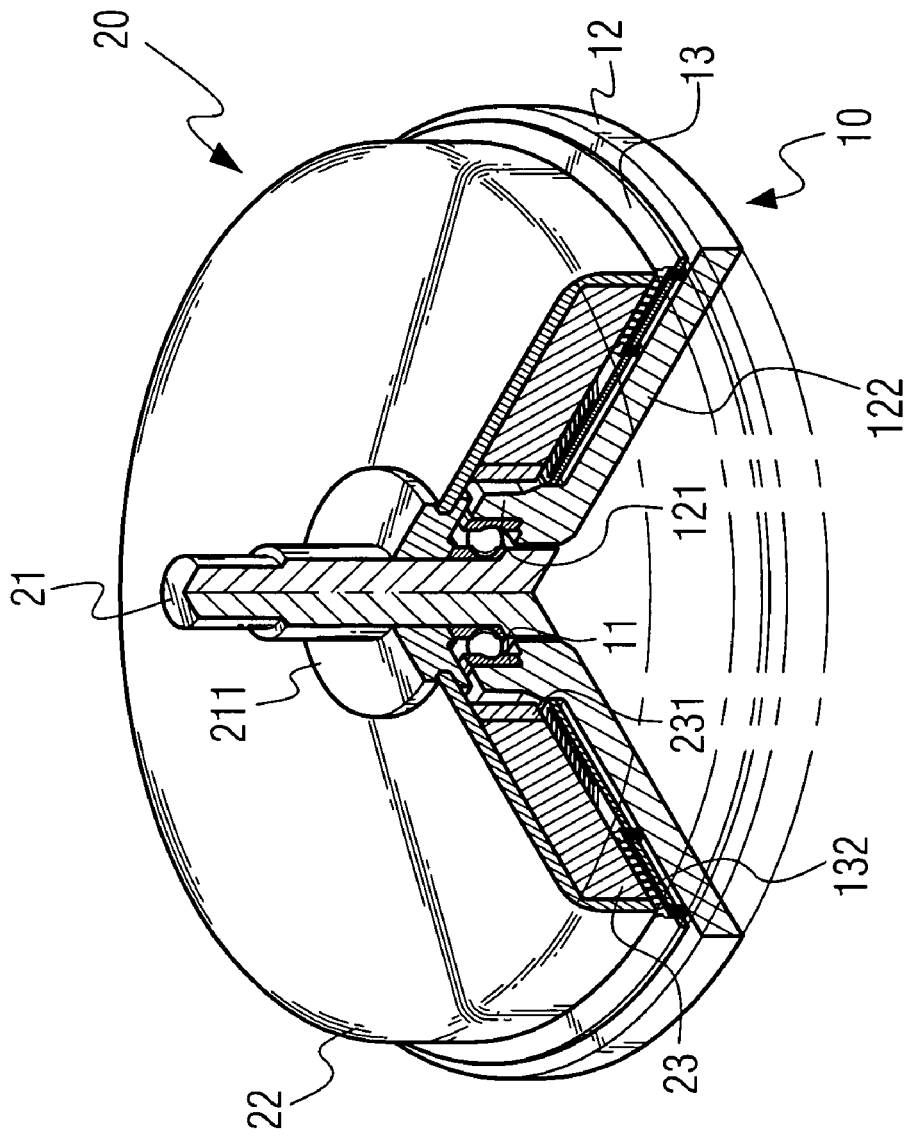
FIG. 2 is a dimensional cutaway view of an ultra-thin motor structure according to a preferred embodiment of the present invention.
Figure 3:
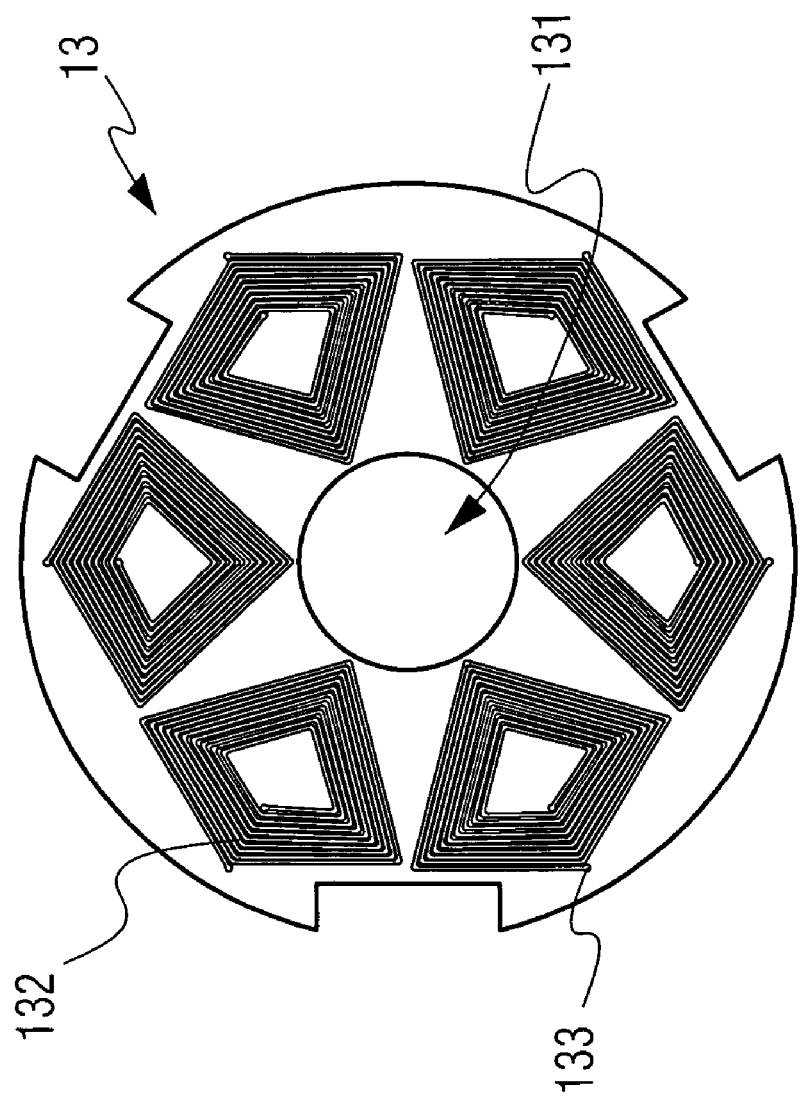
FIG. 3 is a schematic view of a winding plate of an ultra-thin motor structure according to a preferred embodiment of the present invention.

Referring to FIGS. 1 and 2, the invention relates to an ultra-thin motor structure. The ultra-thin motor structure 1 includes a stator assembly 10 and a rotator assembly 20. The stator assembly 10 includes at least one bearing 11 with a bore, a base 12, and a winding plate 13. Furthermore, the base 12 of the stator assembly 10 has a protruding portion 121 and a deck 122. The bearing 11 is disposed in the protruding portion 121 of the base 12, and the winding plate 13 is stacked on the deck 122 of the base 12. More specifically, a guide angle A is formed at the connection between the protruding portion 121 of the base 12 and the deck 122, and a hole 131 (as shown in FIG. 3) is formed at the center of the winding plate 13, so that the winding plated 13, when being stacked on the deck 122 of the base 12, is positioned and fixed by the guide angle A so as to be clamped at the guide angle A. Additionally, the rotator assembly 20 is disposed on the stator assembly 10. The rotator assembly 20 includes a spindle 21, a top cover 22, and a permanent magnet ring 23. The spindle 21 is fixed in the bore of the bearing 11, and the permanent magnet ring 23 is then disposed on the winding plate 13 and supports the top cover 22 thereon. The surface of the spindle 21 is set with a boss 211 disposed on at least one bearing 11. The permanent magnet ring 23 further includes a magnetic conducting ring 231 set on the permanent magnet ring 23.

Referring again to FIGS. 1, 2, and 3, the invention relates to an ultra-thin motor structure. The winding plate 13 of the ultra-thin motor structure 1 includes a plurality of coils, such as the coils 132, formed by an electroforming process or etching process. The coils 132 are rhombus-shaped or kite-shaped in the winding region of the winding plate 13, and effectively increase the magnetic flux area and the power density. The coils have a wire width and height of micro-nanometer scale. The coils 132 include two nodes 133 respectively for inputting and outputting electrical current. When the nodes 133 of the coils 132 of the winding plate 13 is powered, due to the slight air-gap between the winding plate 13 and the permanent magnet ring 23 and magnetic conducting ring 231 of the rotator assembly 20, so that a flux linkage induction is generated between the winding plate 13 and the magnetic poles of the permanent magnet ring 23 and magnetic conducting ring 231, thereby driving the rotator assembly 20. Additionally, because the rotator assembly 20 includes the spindle 21 at the center, the spindle 21 is driven to rotate as well, and when rotating, the spindle 21 outputs power for users to use.

The invention relates to an ultra-thin motor structure. The top cover 22 of the ultra-thin motor structure 1 is made of magnetic conducting material, so that the magnetic flux density and power of the magnetic field is enhanced. Moreover, the material of the winding plate 13 of the stator assembly 10 of the ultra-thin motor structure 1 is a material capable of generating a magnetic induction. Additionally, the material of the permanent magnet ring 23 of the rotator assembly 20 of the ultra-thin motor structure 1 is a material capable of generating a magnetic field effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ultra-thin motor structure, comprising:
   a stator assembly including a base having a protruding portion and a deck, at least one bearing disposed in the protruding portion and having a bore, and a winding plate stacked on the deck and having a plurality of coils formed by an electroforming process, each coil being rhombus-shaped or diamond-shaped; and
   a rotator assembly disposed on the stator assembly, the rotator assembly including a spindle fixed in the bore of the bearing, a top cover, and a permanent magnet ring, and the permanent magnet ring disposed on the winding plate and supporting the top cover thereon.

2. The ultra-thin motor structure according to claim 1, wherein a guide angle is formed at the connection between the protruding portion of the base and the deck, and a hole is formed at the center of the winding plate so that the winding plate, when being stacked on the deck, is positioned and fixed by the guide angle so as to be clamped at the guide angle.

3. The ultra-thin motor structure according to claim 1, wherein the surface of the spindle is set with a boss and is disposed on the at least one bearing.

4. The ultra-thin motor structure according to claim 1, wherein the permanent magnet ring further comprises a magnetic conducting ring set on the permanent magnet ring.

5. The ultra-thin motor structure according to claim 1, wherein the top cover is made of magnetic conducting material.

6. The ultra-thin motor structure according to claim 1, wherein the wire width and height of the coils are of micro-nanometer scale.

7. The ultra-thin motor structure according to claim 1, wherein each of the coils of the winding plate include a pair of nodes for inputting and outputting electric current.

8. The ultra-thin motor structure according to claim 1, wherein the material of the winding plate of the stator assembly is a material capable of generating magnetic induction.

9. The ultra-thin motor structure according to claim 1, wherein the material of the permanent magnet ring of the rotator assembly is a material capable of generating a magnetic field effect.

10. The ultra-thin motor structure according to claim 1, wherein
    each coil includes a first corner and a second corner,
    the first and second corners are disposed on a same radial axis of the winding plate, and
    the first corner and the second corner are opposite corners of the coil.

11. The ultra-thin motor structure according to claim 10, wherein
    each coil further includes a third corner and a fourth corner,
    the third and fourth corners are disposed in a direction perpendicular to the same radial axis, and
    the third corner and the fourth corner are further opposite corners of the coil.

12. The ultra-thin motor structure according to claim 7, wherein each pair of nodes is disposed directly on one of the coils.

13. The ultra-thin motor structure according to claim 7, wherein one of the nodes is disposed directly in an inside corner of the coil, and another one of the nodes is disposed directly at an outside corner of the coil.

* * * * *